United States Patent [19]

Coleman

[11] 3,726,326
[45] Apr. 10, 1973

[54] TREE FELLING MACHINE

[76] Inventor: Thomas R. Coleman, Route 4, P.O. Box 634, Yazoo City, Miss. 39194

[22] Filed: Dec. 6, 1971

[21] Appl. No.: 205,007

[52] U.S. Cl. ............... 144/34 R, 144/34 R, 30/379
[51] Int. Cl. .................. B27b 17/02, A01g 23/08
[58] Field of Search ................ 143/32 N, 32 R; 144/34 E, 34 R, 3 D, 309 AC

[56] References Cited

UNITED STATES PATENTS

| | | |
|---|---|---|
| 3,604,479 | 9/1971 | Jordan .......................... 143/32 N |
| 3,610,301 | 10/1971 | Jordan .......................... 144/34 E |
| 3,672,412 | 6/1972 | Albright ........................ 143/32 N |
| 3,683,979 | 8/1972 | Peltola et al. ................. 143/32 N |

*Primary Examiner*—Donald R. Schran
*Attorney*—Alexander B. Blair

[57] ABSTRACT

A tractor mounted tree felling machine having a pair of hydraulically actuated chain saws with the inner saw slidably mounted on a frame and the outer saw pivotally mounted on a frame to cut the tree from opposite sides thereof. The frame is adjustable in height and rotatable about a longitudinal axis for cutting trees at an angle. A pusher is mounted on the tractor and hydraulically actuated for pushing the tree over as it is being cut in a direction away from the tractor.

6 Claims, 7 Drawing Figures

INVENTOR.
THOMAS R. COLEMAN
BY Alexander B. Blair
ATTORNEY.

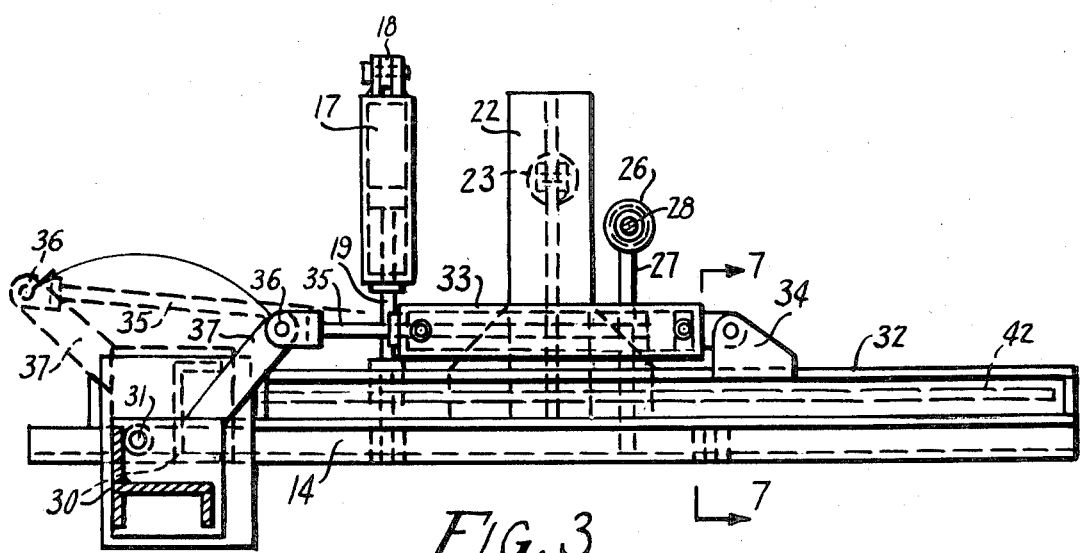
FIG.3
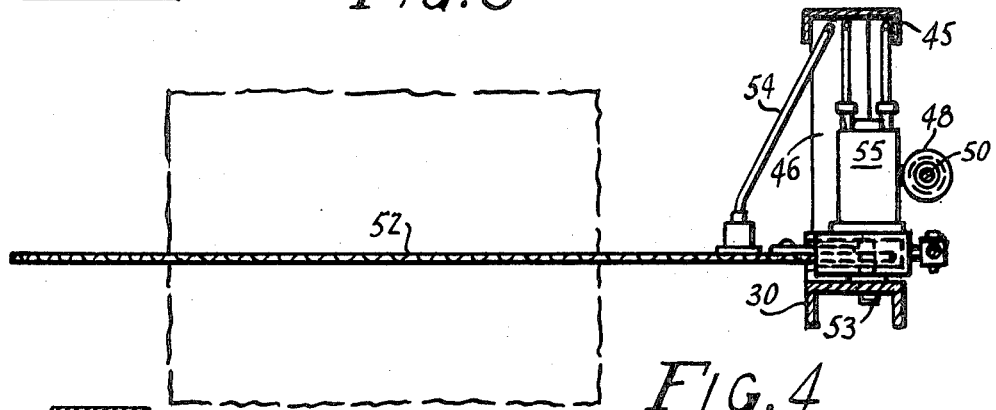
FIG.4
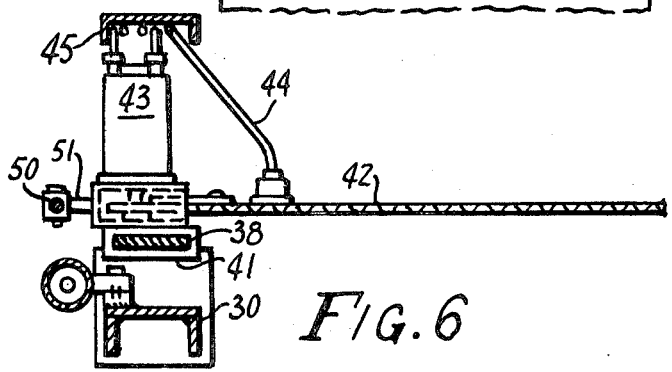
FIG.6
FIG.5
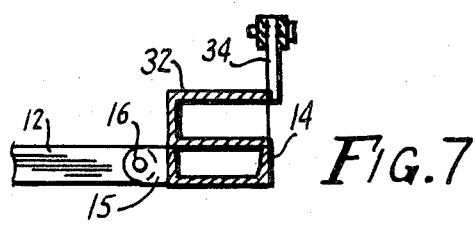
FIG.7
INVENTOR.
THOMAS R. COLEMAN
BY Alexander B. Blair
ATTORNEY.

3,726,326

TREE FELLING MACHINE

BACKGROUND OF THE INVENTION

Field of the Invention

The present invention is directed to a tree felling machine for cutting trees in the forest.

SUMMARY OF THE INVENTION

A tractor mounted frame carries a pair of hydraulically actuated chain saws which are also hydraulically moved into the tree as cutting proceeds. The frame is pivotally mounted to the tractor for movement about a longitudinal axis and the frame is adjustable vertically to vary the height of the cut.

The primary object of the invention is to provide a tractor mounted tree felling machine which can fell a tree in a minimum of time with virtually no hand labor and with complete safety.

Other objects and advantages will become apparent in the following specification when considered in the light of the attached drawings.

BRIEF DESCRIPTION OF THE DRAWINGS

FIG. 3 is a transverse sectional view taken along the line 3—3 of FIG. 2 looking in the direction of the arrows;

FIG. 4 is a transverse sectional view taken along the line 4—4 of FIG. 2 looking in the direction of the arrows;

FIG. 5 is a transverse sectional view taken along the line 5—5 of FIG. 2 looking in the direction of the arrows;

FIG. 6 is a transverse sectional view taken along the line 6—6 of FIG. 2 looking in the direction of the arrows; and FIG. 7 is a fragmentary longitudinal sectional view taken along the line 7—7 of FIG. 3 looking in the direction of the arrows.

DESCRIPTION OF THE PREFERRED EMBODIMENT

Figure 1:
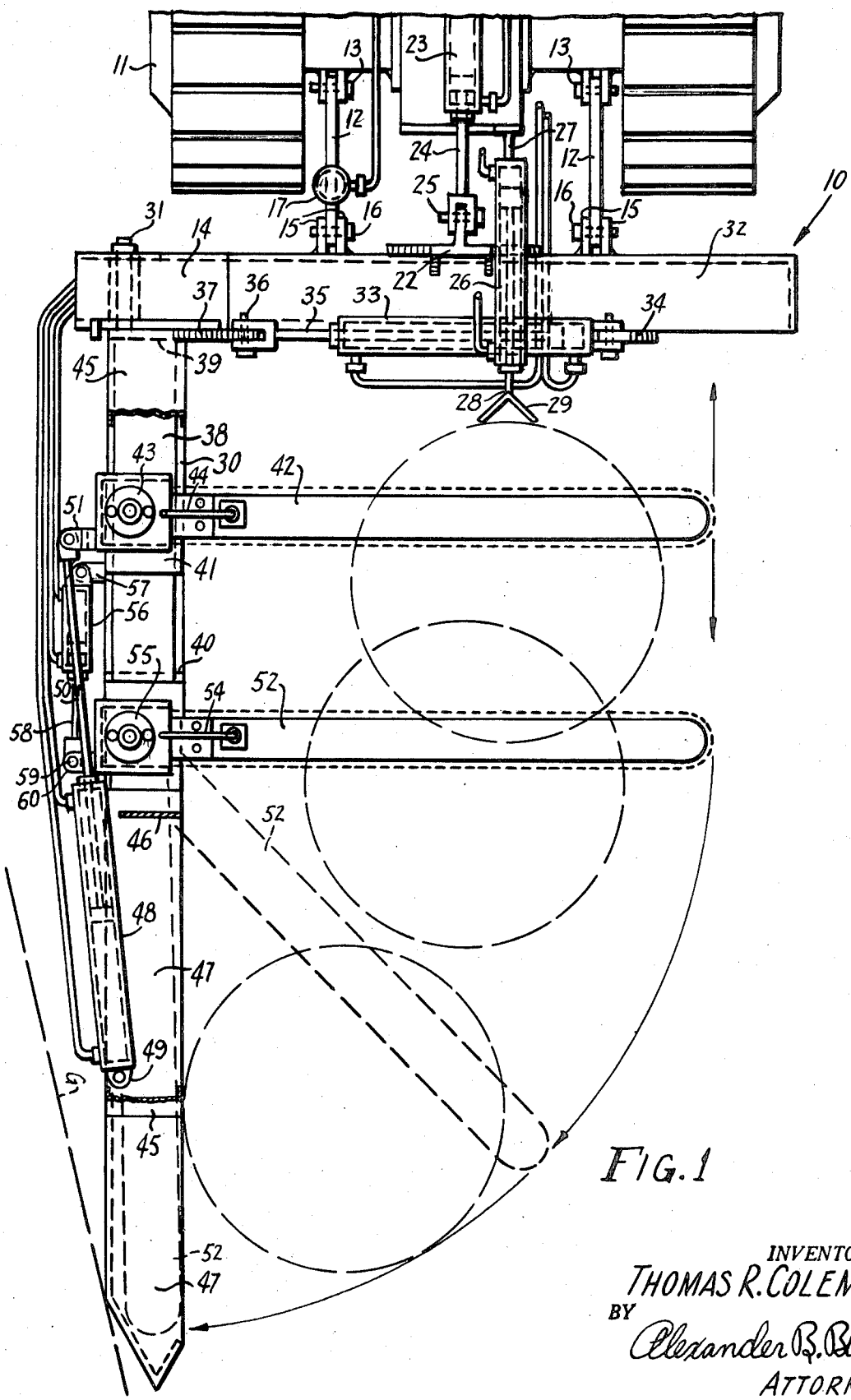
FIG. 1 is a top plan view of the invention with the tractor broken away for convenience of illustration.
Figure 2:
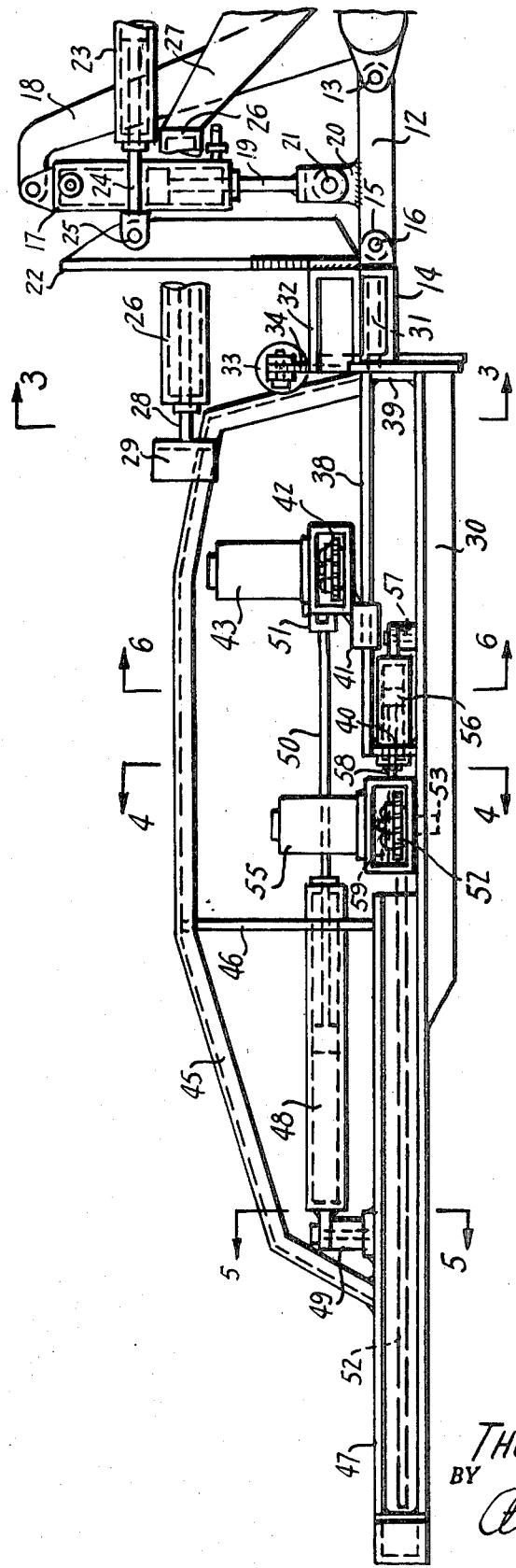
FIG. 2 is a fragmentary side elevation of the invention.

Referring now to the drawings in detail wherein like reference characters indicate like parts throughout the several figures the reference numeral 10 indicates generally a tree felling machine constructed in accordance with the invention.

The tree felling machine 10 includes a tractor 11 of conventional design and having a pair of links 12 pivotally secured thereto by transversely extending pivot pins 13. A transverse frame member 14 extends horizontally across one end of the tractor 11 and has spaced pairs of ears 15 mounted thereon and pivotally secured to the outer ends of the links 12 by pivot pins 16.

A hydraulic cylinder 17 is secured to an arm 18 on the tractor 11 and has the piston rod 19 thereof secured to ears 20 on one of the links 12 by means of a pivot pin 21. Actuation of the hydraulic cylinder 17 causes the frame member 14 to swing upwardly on the links 12.

An upright member 22 is rigidly secured to the frame 14 at its lower end. A hydraulic cylinder 23 is secured to the tractor 11 and has a piston rod 24 secured to the member 22 by a pivot pin 25. Actuation of the hydraulic cylinder 23 tilts the frame member 14 about the pivot pins 16.

A hydraulic cylinder 26 is mounted on an arm 27 extending from the tractor 11 and has a piston rod 28 extending horizontally outward therefrom. A tree engaging V-plate 29 is secured to the piston rod 28 to engage a tree so as to push the tree over when the hydraulic cylinder 26 is actuated and the tree is cut free from its stump.

An elongated frame 30 is secured to the frame 14 by a longitudinally extending pivot pin 31. The frame 30 normally lies in a horizontal plane with its outer end being adjustable by swinging the frame member 14 on the pivot pin 16 or by raising the frame member 14 by swinging the links 12 upwardly. The frame member 14 has a housing 32 formed thereon open on the side thereof opposite the tractor 11. A hydraulic cylinder 33 is secured at one end to a bracket 34 mounted on the housing 32 and has a piston rod 35 extending from the opposite end and secured by a pivot pin 36 to an arm 37 secured to the frame 30. Actuation of the hydraulic cylinder 33 causes the frame 30 to rotate about the pivot pin 31.

A horizontal plate 38 extends above and parallel to the frame 30 and is supported thereon by brackets 39, 40 at its opposite ends. A carriage 41 encompasses the plate 38 and is arranged to slide longitudinally thereon. A chain saw 42 is mounted on the carriage 41 and has a hydraulic motor 43 secured thereto for driving the chain saw 42. A chain saw oiler 44 is connected to the chain saw 42 for supplying lubricating oil thereto. A channel bracing frame member 45 overlies the frame member 30 and is secured thereto at its opposite ends. A bar 46 braces the central portion of the frame member 45 connecting it to the frame member 30.

A housing 47 is secured to the frame member 30 and is open along the inner side thereof. A hydraulic cylinder 48 is connected at one end to a bracket 49 on the housing 47 and has the piston rod 50 thereof connected to a bracket 51 on the carriage 41. Actuation of the hydraulic cylinder 48 causes the carriage 41 to move from end to end on the plate 38.

A chain saw 52 is mounted on the frame 30 on a pivot pin 53 and has an automatic oiler 54 connected thereto for lubricating the chain saw 52.

A hydraulic motor 55 is connected to the chain saw for providing the power therefor.

A hydraulic cylinder 56 is pivotally mounted on a bracket 57 on the frame 30 and has a piston rod 58 pivotally connected at 59 to a bracket 60 on the chain saw 52. Actuation of the hydraulic cylinder 56 swings the chain saw 52 about on the pivot pin 53.

The chain saw 42 in its rearmost position is contained in the housing 32 and the chain saw 52 at one end of its pivotal travel is contained within the housing 47. With the chain saw 42 and the chain saw 52 in their respective housings the tractor 11 may travel through the forest without damaging the chain saws by inadvertent contact with the ground, brush or trees.

In the use and operation of the invention the tractor 11 is driven to an appropriate spot adjacent the tree to be felled with the frame member 30 in contact with the one side of the tree. With the tree in this position the chain saw 52 is swung around on its pivot 53 while being actuated by the hydraulic motor 55 to cut nearly through the tree to be felled. The saw 52 is then swung back into its housing 47 and the pusher plate 29 is brought to bear against the tree by actuating the hydraulic piston 26. The saw 42 is then slid outwardly by actuating the hydraulic cylinder 48 to cut the tree to be felled from the opposite side thereof while simultaneously pushing it over with the pusher plate 29.

The pivotal and height adjustments of the frame 14 permit trees to be cut when the tractor 11 is on a slope which would otherwise prevent cutting. The pivotal adjustment of the frame 30 similarly permits the chain saws 42, 52 to be properly aligned for cutting. The frame 30 may be rotated 90° and engaged under a felled tree so that the saw 42 can be used to cut the tree to the desired lengths.

Having thus described the preferred embodiment of the invention it should be understood that numerous structural modifications and adaptations may be resorted to without departing from the spirit of the invention.

I claim:

1. A tree felling machine adapted for mounting on a tractor comprising a transverse frame, a pair of links pivotally secured to said frame at one end and to said tractor at the opposite end, a hydraulic piston secured at one end to said tractor and at the other end to one of said links to swing said transverse frame upwardly with respect to said tractor, an upright frame member secured to said transverse frame member, a hydraulic cylinder connected at one end to said tractor and having its opposite end connected to said upright frame member for tilting said transverse frame member with respect to said tractor, a longitudinal frame member having one end secured to one end of said transverse frame member by a longitudinally extending pivot, means on said transverse frame member for pivoting said longitudinal frame member about said longitudinal pivot, a chain saw mounted for sliding movement on said longitudinal frame member, a second chain saw mounted for swinging movement on said longitudinal frame member, and means on said longitudinal frame member for sliding said first named chain saw and pivoting said second named chain saw for felling a tree.

2. A device as claimed in claim 1 wherein said chain saws are hydraulic motor actuated and the means for pivoting said longitudinal frame member on its longitudinal pivot includes a hydraulic piston.

3. A device as claimed in claim 2 including a housing for said sliding chain saw on said transverse frame member for protecting said sliding chain saw when not in use.

4. A device as claimed in claim 3 including a housing secured to said longitudinal frame member for housing said pivoting chain saw at one end of the pivotal movement thereof.

5. A device as claimed in claim 4 including a pusher mounted on said tractor and adapted for engagement with the tree to be felled and including a hydraulic cylinder for applying pressure to said pusher.

6. A device as claimed in claim 5 including automatic lubricating oilers mounted on said chain saws.

* * * * *